United States Patent Office 3,420,847
Patented Jan. 7, 1969

3,420,847
PYRROLYL-LOWER-ALKYL-AMIDOXIMES
Malcolm R. Bell, East Greenbush, N.Y., assignor to Sterling Drug Inc., New York, N.Y., a corporation of Delaware
No Drawing. Continuation-in-part of application Ser. No. 519,458, Jan. 10, 1966, which is a continuation of application Ser. No. 345,846, Feb. 19, 1964. This application Apr. 19, 1967, Ser. No. 631,872
U.S. Cl. 260—326.3  5 Claims
Int. Cl. C07d 27/22; C07d 27/24

ABSTRACT OF THE DISCLOSURE

New pyrrolyl-lower-alkyl-amidoximes having hypotensive, psychomotor depressant, psychomotor stimulant, anti-inflammatory, and hexobarbital potentiating activities.

---

This application is a continuation-in-part of my prior copending application Ser. No. 519,458, filed Jan. 10, 1966 which in turn is a continuation-in-part of my prior copending application Ser. No. 345,846, filed Feb. 19, 1964, now U.S. Patent 3,354,174 (patented Nov. 21, 1967).

This invention relates to the field of amidoximes, their acid-addition salts, and to intermediates and processes therefor.

The compounds of the invention are represented by the general formula:

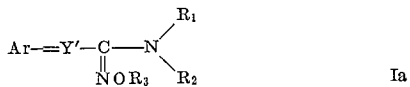

Ia wherein Ar is pyrrolyl; (in which the Y' group can be attached to any ring carbon or nitrogen atom of the Ar moiety); $R_1$ is hydrogen, lower-alkyl, lower-alkanoyl, or hydroxy; $R_2$ is hydrogen or lower-alkyl; $R_3$ is hydrogen, lower-alkanoyl, or lower-alkyl; and Y' is a single chemical bond or alkylene containing from one to five carbon atoms. Moreover, when Y' is alkylene, it can also be substituted on any of the carbon atoms thereof by a hydroxy group. The more convenient synthetic methods are based on use of an aldehyde cyanohydrin of the nitrile,

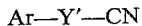

in the general procedures described herein, and these methods afford those compounds where the hydroxy group is attached to the carbon atom adjacent to the amidoxime group and such compounds are preferred.

In the above Formula Ia, $R_1$, $R_2$, and $R_3$, besides representing lower-alkyl, can also represent groups equivalent to lower-alkyl such as lower-alkenyl, e.g. 1-(2-propenyl), 1-(2-methyl-2-propenyl), and the like; lower-alkynyl, e.g. 1-(2-propynyl), 1-(2-butynyl); or benzyl.

Furthermore, the groups $R_1$ and $R_3$ besides representing lower-alkanoyl can also represent groups equivalent to lower-alkanoyl such as benzoyl.

The compounds of Formula Ia where Y' is a hydroxy-alkylene group having the hydroxy group attached to the carbon atom adjacent to the amidoxime group have the structure:

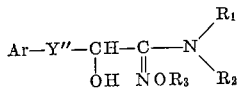

where $R_1$, $R_2$, $R_3$, and Ar have the meanings given above, and Y" is $C_mH_{2m}$ where $m$ is an integer from 0 to 4.

In the above general Formula Ia when $R_1$, $R_2$, and $R_3$ represent lower-alkyl, the lower-alkyl moiety can be straight or branched and can contain from one to about four carbon atoms. Thus $R_1$, $R_2$, and $R_3$ represent, inter alia, methyl, ethyl, isopropyl, or n-butyl.

In the above general Formula Ia, when $R_1$ and $R_3$ are lower-alkanoyl, they can be straight or branched and can contain from one to about four carbon atoms. Thus $R_1$ and $R_3$ represent, inter alia, formyl, acetyl, propionyl, or isobutyryl.

In the above general Formula Ia when Y' represents alkylene, it can be straight or branched. The alkylene group Y' thus stands, inter alia, for methylene, 1,2-ethylene, 2-methylethylene, 1,3-propylene, 2-methyl-1,4-butylene, and 1,5-pentylene.

In the above general Formula Ia, when $R_1$, $R_2$, or $R_3$ represent benzyl or when $R_1$ or $R_3$ represent benzoyl, the benzene ring thereof can be unsubstituted or can bear one or more substituents of low molecular weight and of such nature that they do not interfere with or take part in the reactions, to be described hereinafter, used in the preparation of the compounds. Moreover, the nucleus of the group Ar in any of the compounds of Formula Ia can also be further substituted in any of the rings thereof by one or more of such substituents. Examples of such substituents include halogen, lower-alkyl, lower-alkoxy, lower-alkyl-mercapto, lower-alkylsulfinyl, lower-alkylsulfonyl, nitro, trifluoromethyl, methylenedioxy, benzyloxy, benzyl, isonitrosomethyl, di-lower-alkylamino, lower-alkanoyl, sulfamoyl, and the like.

The compounds of Formula Ia where $R_1$, $R_2$, and $R_3$ are hydrogen are prepared by reacting an aryl-nitrile or an aryl-alkanonitrile with hydroxylamine (suitably in the form of a hydrohalide salt) in an organic solvent inert under the conditions of the reaction and in the presence of a base, for example, alkali metal hydroxides, alkoxides, or carbonates. A preferred base is an alkali metal carbonate, for example, potassium carbonate or sodium carbonate. Suitable organic solvents are methanol, ethanol, isopropanol, benzene, toluene, and the like. A preferred solvent is ethanol. The reaction is represented by the equation:

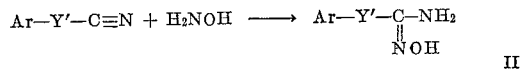

II where Ar and Y' have the meanings given above.

The aryl-alkanonitriles of Formula II required as intermediates in the above-described procedure are prepared by a variety of methods. One method involves the direct alkylation of an aryl nucleus using an appropriate halo-alkanonitrile. The alkylation can take place either on a heterocyclic nitrogen atom bearing a replaceable hydrogen atom, or it can take place on a carbon atom bearing an activated hydrogen atom. The former is illustrated by the preparation of a 1-(cyano-alkyl)indole which is produced when indole (or a substituted-indole) is reacted with a halo-alkanonitrile in the presence of an acid-acceptor. If alkylation of a ring carbon atom is desired, it may be necessary to carry out the alkylation indirectly, that is by reacting the halo-alkanonitrile with a Grignard reagent. This latter method is illustrated by the preparation of a 3-indolyl-alkanonitrile which is produced by reacting a halo-alkanonitrile with a Grignard reagent formed from indole (or a substituted indole) and a lower-alkyl magnesium halide.

A second method for the preparation of the aryl-alkanonitriles of Formula II in which the alkylene group, Y', is 1,2-ethylene comprises reacting acrylonitrile with an aromatic compound having an "activated" hydrogen atom either attached to a carbon atom or to a heterocyclic nitrogen atom. The reaction in the former case generally takes place spontaneously on admixture of the aromatic compound with the acrylonitrile, but in the latter case, it is generally necessary to employ a strong base as catalyst, for example, potassium t-butoxide, sodium hydride, organo ammonium hydroxides, for example Triton B®, and the like.

The aryl-alkanonitriles of Formula II in which the alkylene group, Y', is 1,2-ethylene can also be prepared by the catalytic reduction of the corresponding 3-aryl-acrylonitrile. The latter in turn are prepared by reacting an appropriate aryl carboxaldehyde with cyanoacetic acid under basic conditions and decarboxylating the resulting 3-aryl-2-cyanoacrylic acid over copper chromite.

Still another method for the preparation of the aryl-alkanonitriles of Formula II where the alkylene group, Y', is methylene comprises metathetical replacement of a tertiary amino group of a Mannich base with cyanide ion. This method is illustrated by the preparation of 3-cyano-methyl-7-azaindole from 7-azagramine. The reaction is generally carried out in an aqueous medium at the reflux temperature using equimolar amounts of an alkali metal cyanide and a mineral acid. A preferred reaction medium is aqueous dimethylformamide.

The compounds of Formula Ia where $R_1$ is lower-alkyl and $R_2$ is hydrogen, or where both $R_1$ and $R_2$ are lower-alkyl, are prepared by reacting a hydroxamic chloride derivative of Formula III below, wherein $R_3$, Ar, and Y' have the meanings given hereinabove, with a lower-alkyl-amine or a di-lower-alkylamine, $R_1R_2NH$. The compounds of Formula Ia where $R_1$ is hydroxy and $R_2$ is hydrogen or lower-alkyl are prepared by reacting a hydroxamic chloride derivative of Formula III below, wherein Ar, Y', and $R_3$ have the meanings given hereinabove, with hydroxylamine or an N-lower-alkylhydroxylamine, $R_2NHOH$. These reactions are represented by the following equations:

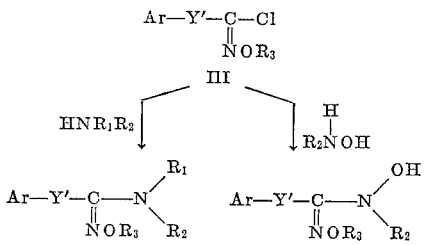

A preferred starting material of Formula III is one wherein $R_3$ is benzyl. The products can then be debenzylated with hydrogen over a suitable catalyst, for example, palladium-on-charcoal or Raney nickel, to produce compounds of Formula Ia where $R_3$ is hydrogen.

The arylhydroxamic chloride-O-benzyl ethers or aryl-alkylhydroxamic chloride-O-benzyl ethers of Formula III ($R_3$ is $CH_2C_6H_5$) are prepared by reacting the corresponding arylamidoxime-O-benzyl ether or aryl-alkanoamidoxime-O-benzyl ether of Formula Ia, where $R_1$ and $R_2$ are hydrogen and $R_3$ is benzyl, with an alkali metal nitrite in the presence of hydrochloric acid under diazotization conditions. The reaction is represented by the following equation:

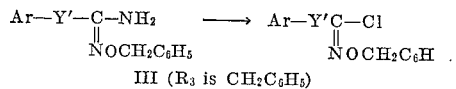

III ($R_3$ is $CH_2C_6H_5$)

where Ar and Y' have the meanings given above.

The arylhydroxamic chlorides or aryl-alkylhydroxamic chlorides of Formula III ($R_3$ is H) are prepared by the reaction of chlorine in chloroform with the corresponding aldoxime.

The compounds of Formula Ia where $R_3$ is lower-alkyl or benzyl are prepared by reacting the corresponding amidoxime, where $R_3$ is hydrogen, with an alkali metal hydride in a suitable organic solvent inert under the conditions of the reaction, for example, dimethylformamide, and reacting the resulting alkali metal salt with a lower-alkyl halide or a benzyl halide. Alternatively, the alkali metal salt can be prepared by reacting the amidoxime with an alkali metal hydroxide in an aqueous or alcoholic medium, e.g. methanol, ethanol, or isopropanol. The reaction is represented by the equation:

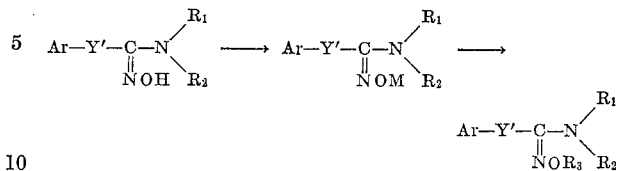

where $R_1$, $R_2$, $R_3$, Ar, and Y' have the meanings given above, except that $R_1$ is not hydroxy, and M represents an ion of an alkali metal.

The compounds of Formula Ia where $R_1$ is lower-alkanoyl are prepared by reacting the corresponding amidoxime ethers, where $R_3$ is lower-alkyl or benzyl and $R_1$ is hydrogen, with a lower-alkanoyl halide. When it is desired to prepare the compounds of Formula Ia where $R_1$ is lower-alkanoyl and $R_3$ is hydrogen, it is necessary to carry out the reaction with the lower-alkanoyl halide using the amidoxime O-benzyl ether ($R_3$ is benzyl). Subsequent catalytic debenzylation affords the compounds where $R_3$ is hydrogen.

The compounds of Formula Ia where $R_3$ is lower-alkanoyl or benzoyl and $R_1$ is hydrogen or lower-alkyl are prepared by reacting the corresponding amidoxime with a lower-alkanoic anhydride or with benzoic anhydride, as the case may be, in the presence of a base such as pyridine. The reaction is preferably carried out in an excess of pyridine, as the solvent medium, and at a temperature in the range from about 0° C. to about 50° C.

The compounds of Formula Ia where Y' is a hydroxyalkylene group with the hydroxy group attached to the carbon atom adjacent to the amidoxime group are prepared by reacting the corresponding cyanohydrin with hydroxylamine using the same conditions as described above for the preparation of the compounds of Formula Ia where Y' is a single bond or alkylene. The reaction is represented by the equation:

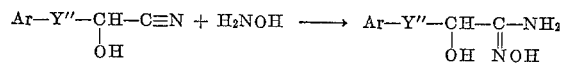

where Ar and Y'' have the meanings given above.

The intermediate cyanohydrins are prepared by reaction of hydrogen cyanide with the corresponding aryl-alkanaldehyde.

The novel compounds of the instant invention are the bases of Formula Ia and the acid-addition salts of said bases, and said acid-addition salts are considered to be the full equivalents of the free bases. The compounds of the invention in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates and alkali metal bicarbonates. The bases thus regenerated can then be interacted with the same or a different acid to give back the same or a different acid-addition salt. Thus the novel bases and all of their acid-addition salts are readily interconvertible.

It will thus be appreciated that Formula Ia not only represents the structural configuration of the bases of my invention but is also representative of the structural entity which is common to all of my compounds, whether in the form of the free bases or in the form of the acid-addition salts of the bases. I have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively they can be converted to pharmaceutically-acceptable acid-addition salts by, for example, ion-exchange procedures.

It will be appreciated from the foregoing that all of the acid-addition salts of my new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new amidoximes, and not in any particular acid anion associated with the salt forms of the compounds; rather, the acid anions, which can be associated in the salt forms, are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formula Ia has demonstrated that they lower the blood pressure in dogs and rats thus indicating their usefulness as hypotensive agents. The compounds have also been shown to possess psychomotor depressant, psychomotor stimulant, anti-inflammatory, and hexobarbital potentiation activities thus indicating their usefulness as tranquilizers, C.N.S. stimulants, anti-inflammatory agents and sedatives.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for use by injection. Alternatively, they can be incorporated in unit dosage form as tablets or capsules for oral administration or in combination with suitable adjuvants such as calcium carbonate, starch, lactose, talc, magnesium stearate, gum acacia, and the like. Still further the compounds can be formulated for oral administration in aqueous alcohol, glycol, or oil solution or oil-water emulsions in the same manner as conventional medicinal substances are prepared.

The chemical structures of the compounds of the invention are established by their mode of synthesis and are corroborated by the correspondence between calculated values for the elements and values found by chemical analysis.

The following examples will further illustrate specific embodiments of the invention without the latter being limited thereto.

PREPARATION OF THE INTERMEDIATES

Example 1

(7-aza-1-indolyl)acetonitrile [II: Ar is 7-aza-1-indolyl; Y' is $CH_2$].—To a stirred solution of 5.9 g. (0.05 mole) of 7-azaindole in 50 ml. of hot dimethylformamide was added 1.2 g. (0.05 mole) of sodium hydride in mineral oil. When hydrogen evolution had ceased, a solution of 3.77 g. (0.05 mole) of chloroacetonitrile in 5 ml. of dimethylformamide was added over a period of fifteen minutes. The reaction was stirred at room temperature for two hours, and taken to dryness in vacuo. The residue was suspended in water and ether, extracted with a benzene/ethyl acetate mixture, and the combined organic extracts were taken to dryness. Recrystallization of the residue from ether afforded 3.8 g. of (7-aza-1-indolyl)acetonitrile, M.P. 81.8–83.8° C. (corr.).

Example 2

δ-(3-indolyl)valeronitrile [II: Ar is 3-indolyl; Y' is $(CH_2)_4$].—A mixture of 5.2 g. (0.215 mole) of magnesium turnings suspended in ether was treated with a solution of 28.4 g. (0.20 mole) of methyl iodide in ether. The resulting mixture was treated with a solution of 23.4 g. (0.20 mole) of indole in ether, and the solution was refluxed for about thirty minutes. The mixture was then cooled in an ice bath and treated rapidly with a solution of 32.4 g. (0.20 mole) of δ-bromovaleronitrile in ether. The mixture was stirred in an ice bath for about two and one-half hours and then refluxed for eighteen hours. The mixture was then treated with aqueous ammonium chloride solution, and the organic layer was separated and washed three times with water, once with sodium bicarbonate, twice again with water, and taken to dryness giving 40.4 g. of a red-brown gum. Fractionation of the latter in vacuo and collection of the fraction boiling at 115–158° C./0.0003 mm. gave 14.9 g. of crude product which was recrystallized once from ethanol/pentane and once from ethyl acetate/hexane to give 10 g. of δ-(3-indolyl)valeronitrile, M.P. 64.0–65.8° C. (corr.).

Example 3

4-chloro-2-cyanoindole [II: Ar is 4-Cl-2-indolyl; Y' is single bond].—A mixture of 10.0 g. (0.052 mole) of 4-chloro-2-indolecarboxamide and 50 ml. of phosphorus oxychloride was heated under reflux for thirty minutes until homogeneous, then cooled and poured into a mixture of 400 g. of ice and 100 ml. of ammonium hydroxide. The mixture was rendered basic by addition of more ammonium hydroxide, cooled, and the solid which separated was collected and dried. Recrystallization of the crude product from benzene gave 5.3 g. of 4-chloro-2-cyanoindole, M.P. 167.4–168.8° C. (corr.).

In similar manner, α-(3-propyl-1-indolyl)acetonitrile was prepared by dehydration of α-(3-propyl-1-indolyl)-acetamide with benzene sulfonyl chloride and pyridine.

α - (3-dimethylaminomethyl-1-indolyl)acetonitrile was obtained as an oil by reaction of α-(1-indolyl)acetonitrile with dimethylamine and formaldehyde in acetic acid.

Examples 4–6

By following one of the appropriate procedures given in Examples 1–3, using the appropriate starting materials, there can be obtained the compounds of Formula II listed below in Table 1.

TABLE 1

| Example | Ar | Y' |
|---|---|---|
| 4 | 2-pyrrolyl | $CH(CH_3)CH_2$ |
| 5 | 3-pyrrolyl | $(CH_2)_2$ |
| 6 | 1-pyrrolyl | $(CH_2)_2$ |

Preparation of the final products

Example 7

β-(7-aza-3-indolyl)propionamidoxime dihydrochloride [Ia; $R_1$, $R_2$, and $R_3$ are H; Ar is 7-aza-3-indolyl; Y' is $(CH_2)_2$].—A solution of 15.3 g. (0.09 mole) of β-(7-aza-3-indolyl)propionitrile, 12.4 g. (0.179 mole) of hydroxylamine hydrochloride, 38 g. (0.36 mole) of anhydrous sodium carbonate and 1,500 ml. of ethanol was refluxed and stirred overnight. The hot mixture was filtered, the filtrate taken to dryness, and the thick oily residue suspended in ethyl acetate, washed with water and aqueous sodium chloride, dried, and taken to dryness. The residue was dissolved in absolute ethanol, the solution was acidified with alcoholic hydrogen chloride and the solid, which separated on cooling, was collected, dried, and recrystallized from ethanol giving 3.5 g. of β-(7-aza-3-indolyl)-propionamidoxime dihydrochloride, M.P. 238.5–239.0° C. (corr.).

Example 8

The following compounds of Formula Ia ($R_1$, $R_2$, and $R_3$ are H) listed in Table 2 below were prepared from an appropriate aryl-alkanonitrile and hydroxylamine using the procedure described above in Example 7. The melting point is corrected.

TABLE 2

| Example | Ar | Y' | M.P./Crystd. from— |
|---|---|---|---|
| 8 | 1-pyrrolyl | $(CH_2)_2$ | 90.0–91.6° C. benzene/hexane |

Example 9

(7-aza-3-indolyl)acetamidoxime-O-acetate [Ia: $R_1$ and $R_2$ are H; $R_3$ is $CH_3CO$; Ar is 7-aza-3-indolyl; Y'' is $CH_2$].—A solution of 19.0 g. (0.1 mole) of (7-aza-3-indolyl)acetamidoxime, 150 ml. of pyridine, and 10 ml. of acetic anhydride was heated at 65° C. on a water bath for ten minutes, and taken to dryness in vacuo. Water was added to the reaction mixture, and again the mixture was taken to dryness. The residue was slurried with water, filtered, dried, and recrystallized from isopropanol giving 15 g. of (7-aza-3-indolyl)-acetamidoxime-O-acetate, M.P. 171.6–172.6° C. (corr.).

Examples 10–12

By reacting an appropriate aryl-alkanonitrile with hydroxylamine using the manipulative procedure described above in Example 7, there can be obtained the compounds of Formula Ia ($R_1$, $R_2$, and $R_3$ are H) listed below in Table 3.

TABLE 3

| Example | Ar | Y' |
|---|---|---|
| 10 | 2-pyrrolyl | $CH(CH_3)CH_2$ |
| 11 | 3-pyrrolyl | $(CH_2)_2$ |
| 12 | 1-pyrrolyl | $(CH_2)_2$ |

Example 13

(1-pyrrolyl)acetamidoxime O-benzyl ether [Ia: $R_1$ and $R_2$ are H; $R_3$ is $C_6H_5CH_2$; Ar is 1-pyrrolyl; Y' is $CH_2$].—By reacting (1-pyrrolyl)acetamidoxime with benzyl chloride, 4-methylmercaptobenzyl chloride, 4-methylsulfonylbenzyl chloride, or 4-trifluoromethylbenzyl chloride, in the presence of sodium hydroxide, there can be obtained, respectively, (1-pyrrolyl)acetamidoxime O-benzyl ether, O-(4-methylmercaptobenzyl)ether, O-(4-methylsulfonylbenzyl)ether, or O-(4-trifluoromethylbenzyl)ether.

Example 14

(1-pyrrolyl)acetamidoxime O-methyl ether [Ia: $R_1$ and $R_2$ are H; $R_3$ is $CH_3$; Ar is 1-pyrrolyl; Y' is $CH_2$].—By reacting (1-pyrrolyl)acetamidoxime with methyl iodide in the presence of sodium hydroxide, there can be obtained (1-pyrrolyl)acetamidoxime O-methyl ether.

Example 15

(1-pyrrolyl)-N,N-diethylacetamidoxime [Ia: $R_1$ and $R_2$ are $C_2H_5$; $R_3$ is H; Ar is 1-pyrrolyl; Y' is $CH_2$].—By reacting the (1-pyrrolyl)acetamidoxime O-benzyl ether, described above in Example 13, with sodium nitrite in the presence of hydrochloric acid at a temperature from about 0° C. to 5° C., there can be obtained (1-pyrrolyl)acetohydroxamic chloride O-benzyl ether. By reacting the latter with diethylamine, there can be obtained (1-pyrrolyl)-N,N-diethylacetamidoxime O-benzyl ether.

By reducing the latter with hydrogen over a palladium-on-charcoal catalyst, there can be obtained (1-pyrrolyl)-N,N-diethylacetamidoxime.

Example 16

(1-pyrrolyl)acetohydroxamic acid oxime [Ia: $R_1$ is OH; $R_2$ and $R_3$ are H; Ar is 1-pyrrolyl; Y' is $CH_2$].—By reacting the (1-pyrrolyl)acetohydroxamic chloride O-benzyl ether described above in Example 15 with hydroxylamine, there can be obtained (1-pyrrolyl)-N-hydroxyacetamidoxime O-benzyl ether. By reducing the latter with hydrogen over a palladium-on-charcoal catalyst, there can be obtained (1-pyrrolyl)-N-hydroxyacetamidoxime.

Similarly, by replacing the hydroxylamine with N-methylhydroxylamine, there can be obtained (1-pyrrolyl)-N-hydroxy-N-methylacetamidoxime.

Example 17

(1-pyrrolyl)-α-hydroxyacetamidoxime [Ia: $R_1$, $R_2$, and $R_3$ are H; Ar is 1-pyrrolyl; Y' is CHOH].—By reacting (1-pyrrolyl)carboxaldehyde with hydrogen cyanide, and reacting the resulting aldehyde cyanohydrin with hydroxylamine using the manipulative procedure described above in Example 7, there can be obtained (1-pyrrolyl)-α-hydroxyacetamidoxime.

Example 18

(1-pyrrolyl)-N-acetylacetamidoxime O-acetate [Ia: $R_1$ and $R_3$ are $CH_3CO$; $R_2$ is H; Ar is 1-pyrrolyl; Y' is $CH_2$].—By reacting (1-pyrrolyl)acetamidoxime with acetic anhydride in the presence of pyridine, using the manipulative procedure described above in Example 9, there can be obtained (1-pyrrolyl)-N-acetylacetamidoxime O-acetate.

Pharmacological evaluation of the compounds of Formula Ia has demonstrated that they lower the blood pressure in rats and mice; they possess psychomotor stimulant as well as depressant activities as evidenced by studies in mice using standard activity cages; and they posses sedative activity as shown by the potentiation of sleeping time in mice induced by ether, thiopental sodium, or hexobarbital sodium. These activities indicate their usefulness as hypotensive agents, tranquilizers, and sedatives.

I claim:

1. A member of the group consisting of a compound of the formula

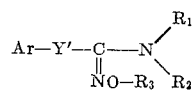

wherein:

Ar is 1-, 2-, or 3-pyrrolyl;
$R_1$ is hydrogen, lower-alkyl, lower-alkanoyl, or hydroxy;
$R_2$ is hydrogen or lower-alkyl;
$R_3$ is hydrogen, lower-alkanoyl, or lower-alkyl, wherein the lower-alkyl and lower-alkanoyl moieties in $R_1$, $R_2$, and $R_3$ have from one to four carbon atoms; and
Y' is alkylene or hydroxyalkylene of from one to five carbon atoms and non-toxic acid-addition salts thereof.

2. A compound according to claim 1 wherein $R_1$, $R_2$, and $R_3$ are hydrogen.

3. β-(1-pyrrolyl)propionamidoxime according to claim 2 wherein Ar is 1-pyrrolyl; and Y' is 1,2-ethylene.

4. A non-toxic acid-addition salt of a compound according to claim 2.

5. A non-toxic acid-addition salt of a compound according to claim 3.

No references cited.

NICHOLAS S. RIZZO, *Primary Examiner.*

J. TOVAR, *Assistant Examiner.*

U.S. Cl. X.R.

260—286, 287, 288, 319.1, 326.15, 326.5, 326.62, 326.9, 999

UNITED STATES PATENT OFFICE
CERTIFICATE OF CORRECTION

Patent No. 3,420,847　　　　　Dated January 7, 1969

Inventor(s) Malcolm R. Bell

It is certified that error appears in the above-identified patent and that said Letters Patent are hereby corrected as shown below:

Column 1, line 33, the formula should show

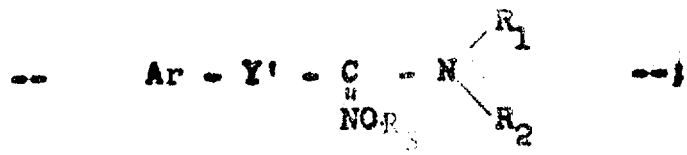

line 70, "and" should read --or--. Column 2, line 60, "whch" should read --which--. Column 3, line 59, the second formula after the arrow should read

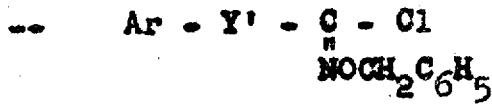

Column 7, line 35, " Y" is $CH_2$" should read --Y' is $CH_2$ --.

SIGNED AND
SEALED
MAY 12 1970

(SEAL)
Attest:

Edward M. Fletcher, Jr.
Attesting Officer